March 31, 1942. C. B. GRAY 2,278,311
SHEET METAL NIBBLING TOOL
Filed May 22, 1941
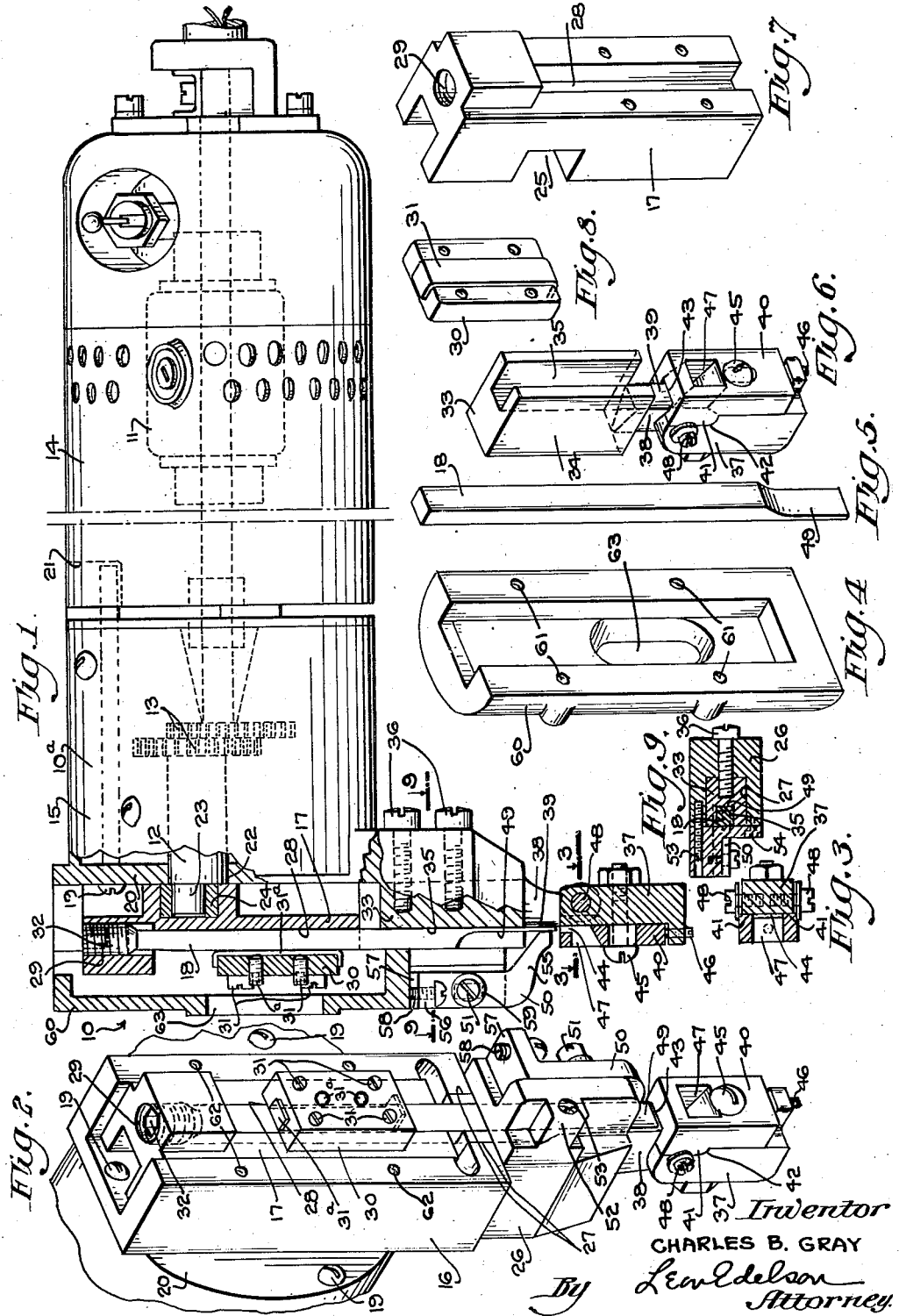
Inventor
CHARLES B. GRAY
By Leo Edelson
Attorney Patented Mar. 31, 1942

2,278,311

UNITED STATES PATENT OFFICE 2,278,311

SHEET METAL NIBBLING TOOL

Charles B. Gray, Millbourne, Pa.

Application May 22, 1941, Serial No. 394,613

15 Claims. (Cl. 30—228)

This invention relates to a metal cutting tool and more particularly to an improved construction of portable, hand-held sheet metal cutting tool of the nibbler type.

It is among the principal objects of the present invention to provide a small, portable and compact nibbling tool adapted to be hand-held for convenience of operation and to facilitate moving of the tool relatively to and about the work to be cut, the tool being provided with a relatively fixed die with which coacts a reciprocating punch or cutting tool of such character and design as to permit the tool to be freely fed to and through the work to be cut, the punch and die coacting with one another to rapidly cut out of the sheet metal or other material being cut a successive series of chips or slugs to forms a slot in the work along a given line.

An important object of the present invention is to provide a portable nibbling tool of the throatless type having a reciprocating cutting tool or punch and a coacting die of such operating characteristics and design as to enable the tool to be readily turned in any direction about the reciprocating axis of the punch to facilitate the cutting of sheet metal along lines of any desired length including curved lines of very small radii.

A further and important object of the present invention is to provide a portable hand-held nibbling tool of the character described wherein the coacting die for the reciprocating punch is adjustably secured to a relatively fixed support.

A further and important object of the present invention is to provide a portable hand-held nibbling tool of the character described wherein the coacting die for the reciprocating punch is adjustably secured to a relatively fixed support which serves as a rigid backing for the cutting edge of the punch and as a pilot or feed-limiting member for limiting the feed of the stock as the nibbling tool cuts a slot therein, the said backing for the punch being designed not only to facilitate cutting of slots along irregular outlines having sharply curved portions but also to withstand the downward cutting thrust of the punch as it penetrates the stock and passes into the cooperating die.

A still further object of the present invention is to provide a nibbling tool of the character described in which is employed a reciprocating punch the lower end of which is in the form of a relatively thin substantially flat blade, the bottom extremity of which coacts with a suitably fixed die to cut out of the stock a series of chips or slugs to form a slot in the work, the tool being further provided with a stripper which engages the front surface of the flattened blade portion of the reciprocating punch to hold the same firmly against its backing, the stripper serving the additional function of stripping the stock from the punch on the return stroke of the latter. The provision of this stripper is an important and novel feature of the present tool, particularly in that it is of such design and construction that it cooperates with the backing for the blade portion of the punch to prevent said blade from swinging forwardly away from its backing and out of alignment with its cooperating die. In other words, the stripper and the pilot or feed-limiting element of the tool cooperate to confine the blade portion of the punch for reciprocation in a definite vertical plane.

Still another object of the present invention is to provide a nibbling tool of the character described having means for facilitating withdrawal of the punch for inspection, repair, maintenance and replacement as desired without necessitating disassembly of the tool and particularly the moving parts thereof.

Still another object is to provide in a tool of the character described a reciprocating punch which is easily maintained in sharpened condition, which is readily adjusted to compensate for the wear to which it may be subjected and which is bodily removable from the tool without disturbing or disrupting any of the parts of the tool which are immediately associated with the punch.

Still further objects of the invention are to provide a nibbling tool which is exceedingly simple in construction and economical to manufacture and assemble, which has a minimum number of operating parts in which the punch and die are each readily accessible for replacement, repair and maintenance, as desired.

Other objects and advantages of the invention will appear more fully hereinafter, it being understood that the invention consists substantially in the combination, construction, location and relative arrangement of parts, all as will be described more fully hereinafter, as shown in the accompanying drawing and as finally pointed out in the appended claims.

In the said accompanying drawing, which illustrates a preferred construction of the parts of the present invention:

Figure 1 is a side view showing partly in elevation and partly in vertical cross-section a tool constructed in accordance with and embodying the principles of the present invention;

Figure 2 is a perspective view of the operating head of the tool, the front cover thereof being removed;

Figure 3 is a transverse sectional view taken on the line 3—3 of Figure 1;

Figure 4 is a perspective view of the front cover plate of the operating head of the tool;

Figure 5 is a perspective view of the punch element per se;

Figure 6 is a perspective view of the die supporting member showing the die secured in position thereon, this member serving also as the lower guide for the reciprocating punch;

Figure 7 is a perspective view of the vertically reciprocable punch supporting member;

Figure 8 is a perspective view of the clamping block for securing the punch operatively in its reciprocating support; and Figure 9 is a transverse sectional view taken on the line 9—9 of Figure 1.

Referring now to the drawing and more particularly to Figure 1 thereof, it will be observed that the nibbling tool of the present invention is of a form and construction adapted to be conveniently held in the hand of the operator thereof, the operating head of the tool, designated generally by the reference numeral 10, being secured in any suitable manner to the forward end of the casing 10ª in which is housed an electric motor 11 for driving the main drive shaft 12 through the intervention of suitable gears 13. Preferably, the casing is composed of two parts in one of which is confined the motor 11 and in the other of which is disposed the gearing 13, these casing parts being respectively designated 14 and 15. Formed integrally upon the outer extremity of the gear casing part 15 is a channel-shaped guide 16 in which is adapted to be vertically reciprocated the supporting block 17 for the punch 18. Preferably, in order to maintain the motor casing part 14 and the gear casing part 15 in the assembled relation shown in Figure 1 a plurality of screws 19 are projected through the forward closed end 20 of the gear casing for threaded engagement with interiorly threaded lugs 21 formed in the motor casing part 14. It will be understood that the casing parts 14 and 15 may be secured together in any suitable manner and, if desired, they may be formed as an integral unit for housing the motor and gears, in which latter event any suitable provision might be made for ventilating the motor casing in accordance with conventional practice. Also, it will be understood that it is not essential that the channel-shaped guide member 16 be formed as an integral part of the gear or motor casing but instead it may be separately secured to the casing end wall 20 by any suitable securing elements.

The main drive shaft 12 of the tool is suitably journalled, as at 22, in the end wall 20 of the cylindrical casing for the tool and is provided with a forwardly extending eccentric 23 on which is fitted a block or shoe 24.

The reciprocating member 17 is provided in its rear face with a transverse slot or groove 25 in which is received the block or shoe 24 fitted upon the eccentric 23, the said block or shoe being of a width less than the width of the transverse slot or groove 25 but of a depth substantially equal to said slot or groove. It will be apparent that the arrangement is such that when the punch supporting member 17 is properly fitted within the channel-shaped guide 16 with the eccentric shoe 24 received within the transverse slot or groove 25, rotation of the shaft 12 will cause the eccentric 23 to shift the block or shoe 24 laterally within the groove 25 simultaneously as said block or shoe acts on the member 17 to effect vertical reciprocation of the latter.

Formed as in integral part of the channel-shaped guide 16 and extending downwardly from the lower extremity thereof is a channel-shaped guide block 26, this block 26 being provided with a frontally presenting channel in continuation of the channel of the upper channeled part 16 but of somewhat reduced width. As most clearly appears in Figure 2, the width of the guide channel in the part 16 is reduced, as at 27, and it is this latter channel 27 of reduced width that is continued downwardly through the lower part 26 of the main guide.

Former in the forward face of the reciprocating punch supporting member 17 is a vertically extending groove 28 (see particularly Figure 7), the upper end of this groove being in free communication with an interiorly threaded bore 29 formed in the top of said reciprocating member 17. Fitted within the vertical groove 28 is the squared shank of the punch 18, the upper portion of this punch being adapted to project freely into the threaded bore 29 aforesaid. A clamping block 30 overlies the squared portion of the punch 18 and is secured to the reciprocating member 17 by means of the bolts 31 to frictionally retain the punch in position against vertical displacement with respect to its supporting member 17. In order to provide for maximum clamping action of the clamping block against the punch, the said block is preferably provided with an inner clamping shoe 31 which is pressed against the punch by means of the set screws 31ª in the block 30 to positively secure the punch immovably in the groove 28 of the reciprocating member 17.

Adapted to be fitted within the interiorly threaded bore 29 in the upper end of the reciprocating block 17 is a screw 32, this screw being arranged in vertical alignment with the punch and being adapted to engage the upper end of the latter to serve not only as a fixed upper abutment for the punch to prevent upward displacement of the latter at each impact of the punch against the metal being cut during the downward working stroke of the punch, but also as a means for adjusting the punch vertically along its reciprocating axis, it being apparent that by adjusting the said screw 32 in one direction or another a punch of given length may be positionally adjusted to present its cutting edge in more or less closely spaced relation to the cooperating die for the punch. Also, this screw 32 serves the additional important function of enabling the tool to be adjusted into proper cutting relation with the die, this adjustment being particularly necessary upon each redressing and resharpening of the punch. Obviously, as the cutting edge of the punch is reground, the over-all length of the punch is shortened and the screw 32 is capable of axial adjustment to compensate for the reduced length of the punch, thereby assuring at all times proper cutting relation between the punch and die. It will be understood, of course, that in order to effect this vertical adjustment of the punch, the clamping block 30 is first required to be loosened from its clamping engagement with the punch.

Also, it will be noted that the cross-sectional dimension of the punch is such that it may be freely projected lengthwise through the opening 29 when the adjusting screw 32 is removed from said opening. Consequently, by suitably loosening the screws 31ª in the clamping block 30 so as to relieve the pressure of the shoe 31 against the punch and then removing the adjusting screw 32, the punch may be bodily removed from the tool by projecting it axially through the adjusting screw opening 29.

Fitted within the channel-shaped guide block 26 is the combination die-supporting and feed limiting unit, designated generally by the reference numeral 33 and shown most clearly in Figure 6. This unit 33 is provided with a channel shaped upper portion 34 which is adapted to be received in the vertically aligned channels respectively formed in the lower part of the upper guide 16 and the lower guide block 26, the forwardly presenting channel 35 of the unit 33 being of a depth and width equal to the depth and width of the channel or groove 28 in the reciprocating punch supporting block 17. The unit 33 is secured fixedly in position within the lower guide block 26 by means of a pair of screws 36 which are projected commonly through the base walls of the nested channeled members 26 and 34. As appears most clearly in Figures 1 and 2, the forwardly presenting channel 35 of the unit 33 is in spaced vertical alignment with the similarly presenting channel 28 of the reciprocating block 17, the punch 18 being disposed commonly in these verticaly aligned channels. It will thus be apparent that the channel 35 of the unit 33 serves as a fixed guide for the lower portion of the reciprocating punch 18, the latter being, of course, reciprocable in unison with its supporting block 17. Extending downwardly from the channeled portion 34 of the unit 33 is a die-supporting extension or beam 37 which is connected to the channeled portion 34 by an intermediate neck section 38 of reduced cross-section. This intermediate neck section 38 serves not only as the backing for the lower free end of the reciprocating punch but also as the means for limiting the feed of the work relatively to the tool. As appears most clearly in Figure 6, this intermediate neck section 38 is provided with a flat frontal face 39 which is in continuation of and is disposed in the vertical plane of the vertically aligned inner base walls of the channels 28 and 35. Also, the width of this front face 39 of the section 38 is no greater than the effective width of the punch 18 and, if desired, may be of less width than that of the punch. Further, it will be observed that the said neck section 38 diminishes in width from front to rear thereof. By so shaping the said neck portion 38 of the die support in the vicinity of the feeding plane of the sheet metal to be cut, it becomes possible to cut a slot in the sheet material of a width equal to that of the punch and at the same time permit the tool as a whole to be more or less freely rotated in said slot to change the direction of the latter as circumstances may require. Thus, the tool is adapted to slit sheet material along sharply curved as well as straight lines of indeterminate length.

The die-supporting beam 37 is formed as an integral part of the unit 33 and is of the form most clearly shown in Figures 1, 2 and 6 it being observed that said portion 37 is provided on its frontal face with a seat for a die member 40. This die member is provided in the upper portion thereof with a pair of laterally spaced wing-shaped elements 41—41 which are respectively adapted to be accommodated in suitable recesses 42—42 provided therefor in the portion 37. The die member is cut-out, as at 43, so that it forms conjointly with the front flat face 39 of the intermediate portion 38 a die opening 44. The laterally spaced wing elements 41—41 of the die member are spaced apart a distance equal to the width of the punch and so define the lateral limits of the die opening, the backing of the die opening being defined by the flat front face of the feed-limiting part 38 and the front edge of the die opening being defined by the edge 43 of the die member.

The die member is secured to its support 37 by a bolt 45 and may be adjusted vertically with respect to its support by means of a screw 46 (see Figure 1) which is threaded into a portion of the support 37 which immediately underlies the bottom of the die member. The die member is further provided with an opening 47 leading from the die opening 44 to and through the front surface of the die member for discharge of the slugs or chips cut out of the sheet metal by the coacting punch and die.

In order to insure accurate registry of the die opening with the punch, provision has been made for adjustment of the die member laterally of its support 37. As most clearly appears in Figure 3, the die member 40 is of a width somewhat greater than the width of its support 37. Consequently, by means of screws 48—48 projecting into opposite sides of the die support 37 with their heads overlapping the immediately adjacent edges of the die member, the latter may be shifted to one side or the other by the simple expedient of tightening one screw as the other is loosened. Thus, the lateral edges of the die opening are assured of registry with the corresponding edges of the punch.

As appears most clearly in Figures 1 and 5, the punch 18 is formed of square or rectangular stock, the lower end thereof being ground away, as at 49, to provide a relatively thin blade, the cutting edge of which is of rectangular shape corresponding to the shape of the die opening 44. It is this thin blade portion 49 of the punch that is backed by the reduced feed limiting portion 38 of the unit 33.

Operatively associated with the punch to strip the sheet metal therefrom upon each upward stroke of the punch is a stripper 50 (see Figure 1). This stripper is pivotally supported, as at 51, upon the member 52 which is secured to and serves as a cover for the lower channeled block 26. As appears most clearly in Figures 2 and 9, this member 52 is secured in place by the screws 53 and 54. The stripper 50 is of generally bell-crank shape, as shown in Figure 1, the lower arm 55 of which is inturned to engage the blade portion 49 of the reciprocating punch. The opposite arm 56 of the stripper is provided with an outwardly turned wing 57 through which projects a screw 58 which is outwardly offset from the vertical plane of the screw 51. By adjusting the screw 56, the stripper 50 may be correspondingly adjusted into more or less firm engagement with the blade portion of the punch. In addition, the stripper is provided with an elongated opening 59 through which projects its pivot bolt 51 to provide for vertical adjustment of the stripper with respect to its pivot, this vertical adjustment being obtained by corresponding adjustment of the screw 56 when the pivot bolt or screw 51 is loosened. It will be understood, of course, that having once made the proper adjustments of the stripper both for distance of its lower edge above the die and for pressure engagement against the blade portion of the reciprocating punch, the pivot screw 51 is tightened to lock the stripper in its adjusted position.

In order to enclose the moving parts of the operating head of the tool, as well as to prevent displacement of the block 17 from its channeled guideway during reciprocation of the block, a cover plate 60 is provided (see Figures 1 and 4), this plate being secured to the channeled main guide member 16 by means of suitable screws which are projected through the openings 61 provided in said cover plate and into the threaded apertures 61 of said main guide. The inner flat edges of this cover plate are each of a width sufficient to overlie the outer marginal portions of the block 17 and so prevent displacement of the latter. In addition, this cover plate 60 is provided with an opening 63 to provide access to the clamping screws 64—64 which act upon the clamping strip 31 to clamp the punch securely in position within its reciprocating support 17.

It will be apparent that in the tool as just described, the punch 18 may be adjusted axially with respect to its die opening 44 by first loosening the screw 64 and then adjusting the upper adjusting screw 32 as desired. It will be understood, of course, that for proper adjustment of the punch its upper end must be at all times in abutting contact with the inner end of the adjusting screw 32.

It will further be observed that the overall dimensions of the die and its immediately associated supporting structure are sufficiently small to permit the same to be projected through a relatively small opening preliminarily provided in the sheet metal to be cut when it is desired to cut a design or outline in the sheet metal without passing through an edge thereof.

Still further, it will be observed that in the tool of the present construction the reduced neck portion 38 of the die-supporting beam 37 serves as a feed limiting member or pilot to limit the feed of the work as the latter is shifted relatively to the tool during the cutting operation. In addition, the said neck portion 38 backs up and so reinforces the lower cutting portion of the tool which is of reduced cross-section to provide a relatively thin cutting edge. By providing this relatively thin cutting edge, the bite of the punch on each downward stroke thereof is sufficiently small to prevent jamming of the punch in the work, to provide neat, smooth cuts, to enable the tool to be operated at high speed, and most important to provide for cutting along curves of very small radii. This latter much desired objective is attained due to the small bite of the punch on the work and to the fact that the front cutting edge of the punch is closely adjacent the front or feed-limiting face of the neck 38.

Finally, in the tool of the present construction the stripper 50 serves the important function, in addition to that of stripping the material from the punch during each forward stroke of the latter, of restraining the thin blade portion of the punch from any tendency to flex outwardly and away from its backing member 38. Thus, the blade portion of the punch is assured of constant registry with the die opening and so prevents injury to and premature wear of both the punch and the die.

While in the construction shown, the reciprocable punch is provided with a flattened blade portion to form a thin cutting edge of rectangular shape, it will be understood that the form of this punch may be varied as desired, as for example, by forming it of half-round stock throughout its length to thereby provide an arcuately shaped front cutting edge terminating in a straight edge at the rear side of the tool. In such case, of course, the die will necessarily be provided with a correspondingly shaped die opening.

It will be understood, of course, that the invention is susceptible of various other changes and modifications which may be made from time to time without departing from the general principles or real spirit thereof and it is, accordingly, intended to claim the same broadly, as well as specifically, as indicated by the appended claims.

What is claimed as new and useful is:

1. A portable self-contained motor-driven sheet metal cutting tool comprising a main casing in which is housed the motor drive for the tool, an elongated guide member provided in the outer end of said casing, a vertically reciprocal ram slidably fitted in said guide member, means intervening said motor drive and said ram for imparting reciprocatory motion to said ram, a die support detachably secured to said guide member in vertically spaced relation thereto, said ram and said die support being respectively provided with longitudinally aligned channels, a punch fixedly secured in said ram channel and reciprocable in said die support channel, said die support being provided with a solid neck part immediately beneath the channeled part thereof to provide a rigid backing for the reciprocating punch, a clamping block secured to the ram in overlying relation with respect to the punch to clamp the latter securely to the ram, and a cover plate secured to the guide member for embracing the ram, said cover plate being provided with an opening therein for access to the clamping block.

2. A portable self-contained motor-driven sheet metal cutting tool comprising a main casing in which is housed the motor drive for the tool, an elongated guide member provided in the outer end of said casing, a vertically reciprocal ram slidably fitted in said guide member, means intervening said motor drive and said ram for imparting reciprocatory motion to said ram and die support detachably secured to said guide member in vertically spaced relation thereto, said ram and said die support being respectively provided with longitudinally aligned channels, a punch fixedly secured in said ram channel and reciprocable in said die support channel, said die support being provided with a solid neck part immediately beneath the channeled part thereof to provide a rigid backing for the reciprocating punch, said neck part of the die support being reduced in transverse cross-section from front to rear thereof, the punch backing surface thereof being flat and of a maximum width not exceeding that of the punch.

3. In a motor-operated portable hand-held nibbling tool, a main casing in which is housed the motor drive for the tool, a plate closing the front end of said casing and having formed thereon an elongated guide way, a ram disposed in said guide way, means interconnecting said ram and motor drive for effecting reciprocation of said ram in said guide way, said ram being provided with an elongated groove in its frontal face for receiving a punch, a punch fitted within said groove, clamping means for securing said punch fixedly within the ram groove, and means normally disposed in the upper end of said ram providing a fixed abutment for the latter, said means being so designed that upon removal thereof the punch is adapted to be removed from the ram by movement of the punch lengthwise through the space normally occupied by said removable means.

4. In a motor-operated hand-held nibbling tool for slitting sheet material, a main casing housing the motor drive for the tool, a punch disposed at the forward end of said casing for reciprocation along a line extending transversely of the casing, a reciprocating block in which said punch is secured and with which it reciprocates, means for clamping said punch immovably in said ram, an adjustable abutment for the upper end of said punch carried by said ram, and means for encasing said reciprocating ram and the portion of the punch carried thereby, said means including a cover plate having an aperture therein affording access to said clamping means for the punch, said abutment for the upper end of the punch being in the form of a screw threaded into an opening provided therefor in the upper end of said reciprocating block, said opening being in axial alignment with the punch and of a diameter sufficiently large to permit the punch to be withdrawn lengthwise therethrough upon removal of said screw.

5. In a motor-operated hand-held nibbling tool for slitting sheet material, a main casing for housing the motor drive for the tool, an elongated guide way disposed at the forward end of said casing, a block disposed in said guide way and adapted to be reciprocated therein, a combined feed limiting and die support member fixedly secured in said guide way below said reciprocating block, said block and said fixed member being respectively provided with longitudinally aligned channels for commonly receiving therein an elongated punch member, a punch fixedly secured in the channel of said reciprocating block with the lower portion thereof slidably disposed in the channel of said fixed member, the base wall of said last mentioned channel being extended downwardly to provide a relatively fixed backing for the free lower extremity of the reciprocating punch, said backing being of a width not exceeding that of the punch in its plane of contact with the latter and of gradually reduced width rearwardly of said plane.

6. In a motor-operated hand-held throatless nibbling tool for slitting sheet material having a vertically reciprocable punch and a coacting relatively fixed die, means for imparting reciprocatory movement of said punch including a grooved reciprocating block in which said punch is immovably secured, and a die support disposed beneath said reciprocating block, said die support including an upper bodied portion including a grooved upper bodied portion, a lower die supporting portion and an intervening neck part, the groove in the upper portion of said die support being in longitudinal alignment with the groove in the reciprocating block for slidably receiving the lower portion of the reciprocating punch and the base of said groove in the die support being in longitudinal continuation with the frontal face of said intervening neck part, said neck part being reduced in transverse cross-section rearwardly of its frontal face.

7. In a motor-operated hand-held nibbling tool for slitting sheet material, a main casing housing the motor drive for the tool, a punch disposed at the forward end of said casing for reciprocation along a line extending transversely of the casing, means for effecting reciprocation of said punch, and a fixed guide for the lower part of said punch, said guide having an upper channeled part and a lower solid part having a front punch-engaging surface co-planar with the base of said channeled part, said solid part being of a width in said front face thereof not exceeding the width of the tool and of gradually reduced cross-section rearwardly of said face.

8. In a motor-operated hand-held nibbling tool for slitting sheet material, a main casing housing the motor drive for the tool, a punch disposed at the forward end of said casing for reciprocation along the line extending transversely of the casing, means for effecting reciprocation of said punch, a fixed guide for the lower part of said punch, said guide having an upper channeled part and a lower solid part having a front punch-engaging surface co-planar with the base of said channeled part, said solid part being of a width in said front face thereof not exceeding the width of the tool and of gradually reduced cross-section rearwardly of said face, and a stripper operatively associated with said reciprocating punch and having a part bearing against the frontal face of the punch in the immediate region of said solid part whereby to restrain the punch from any tendency to flex outwardly and away from said solid part.

9. In a motor-operated nibbling tool of the character defined in claim 8 wherein is provided means for vertically adjusting said stripper to accommodate different thicknesses of sheet metal to be cut.

10. In a motor-operated nibbling tool of the character defined in claim 8 wherein said stripper is of bell-crank form and is provided with a lower depending arm which serves the dual function of pressing said punch against said solid part and of stripping the sheet metal from the punch on each upward stroke of the latter.

11. In a motor-operated hand-held nibbling tool, a main casing housing the motor drive for the tool, a reciprocating block disposed at the forward end of said casing and adapted to be reciprocated by said motor drive, a punch fixedly associated with said block and reciprocable therewith, a cover plate secured to the front of said casing to substantially enclose said reciprocating block, means for clamping said punch securely in said reciprocating block, and means for effecting adjustment of said punch longitudinally in said block, said punch adjusting means being in the form of a screw fitted into the top of said block in axial alignment with said punch, said screw being of a diameter sufficiently large to permit the punch to be withdrawn lengthwise through the upper end of said block upon removal of said screw.

12. In a motor-operated hand-held nibbling tool for slitting sheet material, a main casing housing the motor drive for the tool, a reciprocating block disposed at the forward end of said casing and adapted to be reciprocated by said motor drive, a punch fixedly associated with said ram and reciprocable therewith, a relatively fixed guide for said punch arranged in longitudinally spaced relation with respect to said reciprocating block, said guide including an upper channeled port, a lower die supporting part and an intermediate connecting neck part, said neck part being of a maximum width not exceeding the internal width of the channeled part of said punch guide and having a frontal face co-planar with the base of said channeled part and with the frontal face of the lower die supporting part, and a die carried by said lower die supporting part of the punch guide, said die including means for adjusting the same both vertically and laterally with respect to its support.

13. In a motor-operated hand-held nibbling tool for slitting sheet material, a main casing housing the motor drive for the tool, a punch disposed at the forward end of said casing, means for effecting reciprocation of said punch, a relatively fixed guide for said punch, said guide including as a part thereof a support for the die, said guide and its die supporting part being formed as a detachable unit adapted to be bodily removed from the tool and including an elongated frontal face which serves commonly as a backing for the lower free extremity of the reciprocating punch, as a feed limiting member and as the rear boundary of the die opening, the portion of said guide in the immediate zone of the work-feeding plane being of gradually reduced width rearwardly of said frontal face.

14. In a nibbling tool of the character defined in claim 13 wherein said punch is reduced in its lower extremity to provide a relatively thin blade portion of substantially rectangular cross-section, and wherein is included a stripper member which is adapted to engage said blade portion of the punch to restrain the same against any tendency to flex outwardly away from its backing.

15. In a motor-operated hand-held nibbling tool, a main casing housing the motor drive for the tool, a reciprocating block disposed at the forward end of said casing and adapted to be reciprocated by said motor drive, a punch fixedly associated with said block and reciprocable therewith, a cover plate secured to the front of said casing to substantially enclose said reciprocating block, means for clamping said punch securely in said reciprocating block, and means for effecting adjustment of said punch longitudinally in said block, wherein said cover plate is provided with an opening therein affording access to the said punch clamping means.

CHARLES B. GRAY.